United States Patent
Miskech et al.

[11] Patent Number: 5,876,078
[45] Date of Patent: Mar. 2, 1999

[54] BUMPER AND FRONT RAIL ASSEMBLY FOR VEHICLE

[75] Inventors: Peter Miskech, Troy; Leonard Anthony Shaner, New Baltimore; Joseph Paul Tekelly, Troy; Bhadresh V. Vyas, Canton; David George Heinemann, Ortonville; David Alan Hall, Novi, all of Mich.

[73] Assignee: Ford Global Technologies, Inc., Dearborn, Mich.

[21] Appl. No.: 786,584

[22] Filed: Jan. 21, 1997

[51] Int. Cl.⁶ ................................... B60R 19/34
[52] U.S. Cl. .................... 293/133; 293/132; 296/188; 296/187
[58] Field of Search ................... 293/132, 133, 293/102, 121, 122, 155; 296/187, 188, 189, 203.02

[56] References Cited

U.S. PATENT DOCUMENTS

| | | | |
|---|---|---|---|
| 4,829,979 | 5/1989 | Moir | 293/132 |
| 5,314,229 | 5/1994 | Matuzawa et al. | 296/189 |
| 5,429,388 | 7/1995 | Wheatley et al. | 296/189 |

FOREIGN PATENT DOCUMENTS

| | | |
|---|---|---|
| 405185955A | 7/1993 | Japan . |
| 407002033A | 1/1995 | Japan . |
| 407040858A | 2/1995 | Japan . |

*Primary Examiner*—D. Glenn Dayoan
*Assistant Examiner*—Jason Morrow
*Attorney, Agent, or Firm*—Daniel M. Stock; Roger L. May

[57] ABSTRACT

A bumper and front rail assembly includes first and second front rails with a steel cross-member extending therebetween. The steel cross-member has a substantially U-shaped cross-section. A steel forward member is secured to the cross-member and spans the length thereof. The forward member is configured to act as a spring for elastic deformation against the cross-member in a low energy impact. First and second steel crush cans are disposed in the cross-member adjacent the first and second front rails, respectively. The crush cans are configured for improved energy management.

20 Claims, 5 Drawing Sheets

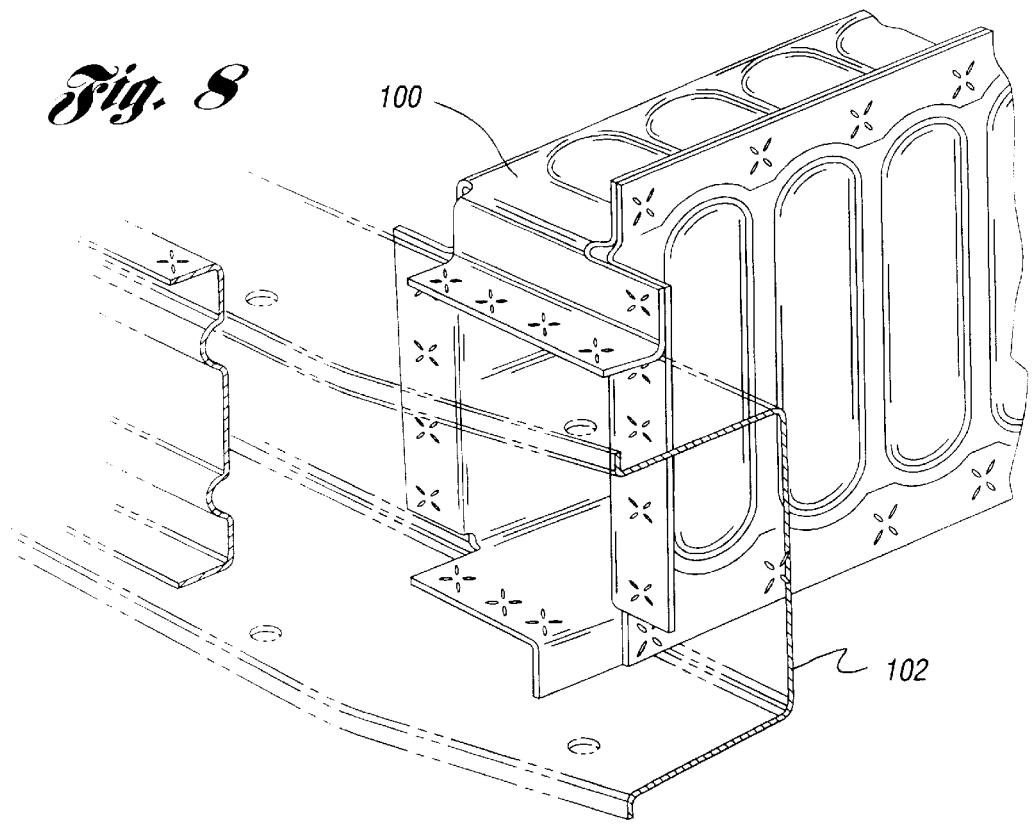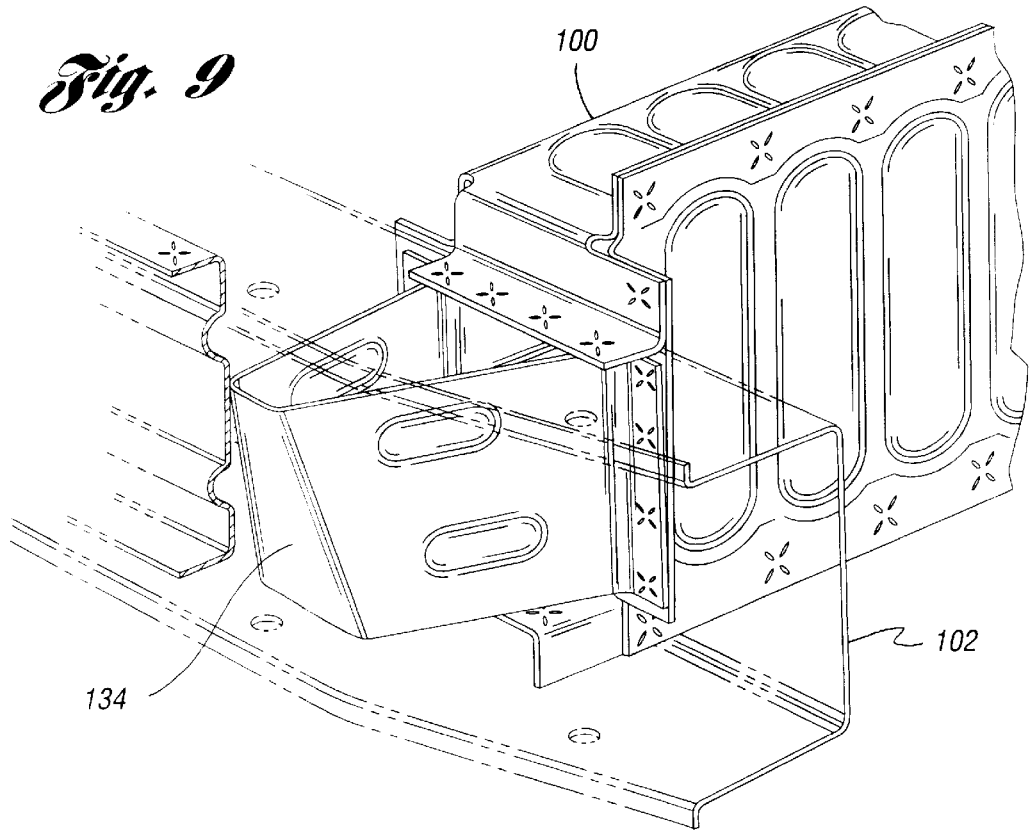

BUMPER AND FRONT RAIL ASSEMBLY FOR VEHICLE

TECHNICAL FIELD

The present invention relates to a bumper and front rail assembly for a vehicle including spring-steel dike components for improved energy management.

BACKGROUND OF THE INVENTION

Typically, vehicle bumpers comprise a primarily plastic and/or steel construction designed for elastic deformation up to a 5 mile per hour impact. These bumpers are typically not of sufficient structural integrity to dissipate substantial energy in a high energy impact, i.e., an impact above 5 mph and up to 40 mph. Accordingly, since such bumper systems are typically 4–6 inches in depth, this 4–6 inches is wasted length which could be used for energy management. Also, such bumpers typically have insufficient structural integrity to generate a deceleration pulse significant enough to be sensed by a vehicle deceleration sensor for airbag deployment.

Another shortcoming of such bumpers is that offset frontal impacts create an energy pulse which is absorbed almost entirely in one of the front rails, and the energy management characteristics of the opposing front rail is not utilized.

Accordingly, it is desirable to provide a bumper and front rail assembly for a vehicle which deforms elastically in a low energy impact (less than 5 miles per hour), and absorbs a greater amount of energy in a high energy or high velocity impact in a manner sufficient to create a deceleration pulse which may be sensed for deployment of an airbag. It is further desirable to create a bumper and front rail assembly for a vehicle in which both front rails are used to dissipate energy in an offset frontal impact.

DISCLOSURE OF THE INVENTION

The present invention overcomes the above-referenced shortcomings of prior art vehicle bumper and front rail assemblies by providing a bumper assembly which comprises elongated engaging high strength steel members adapted for elastic deformation in a low energy impact, and further comprises crush cans disposed therebetween for increased energy dissipation in a high energy impact. One of the elongated steel members is welded at locations positioned along its length to the front rails for added torsional rigidity to distribute load between the front rails in an offset impact.

More specifically, the present invention provides a bumper and front rail assembly for a vehicle including first and second front rails and a steel cross-member extending therebetween. The steel cross-member has a substantially U-shaped cross-section. A steel forward member is secured to the cross-member and spans the length thereof. The forward member is configured to act as a spring for elastic deformation against the cross-member in a low energy impact. First and second steel crush cans are disposed in the cross-member adjacent the first and second front rails, respectively. The crush cans are configured for improved energy management.

Accordingly, an object of the present invention is to provide a bumper and front rail assembly for a vehicle including engaging elongated steel members configured for elastic deformation in a low energy impact, and also including crush cans secured therein and adapted for increased energy absorption in a high energy impact.

The above object and other objects, features, and advantages of the present invention are readily apparent from the following detailed description of the best mode for carrying out the invention when taken in connection with the accompanying drawings.

BRIEF DESCRIPTION OF THE DRAWINGS

FIG. 8 shows a partially phantom perspective view of a front rail, cross-member and reinforcement member assembly in accordance with the embodiment shown FIG. 7;

FIG. 9 shows a partially phantom perspective view of a front rail, cross-member and crush can assembly in accordance with the embodiment shown in FIGS. 7 and 8.

DETAILED DESCRIPTION OF THE PREFERRED EMBODIMENT

Figure 1:
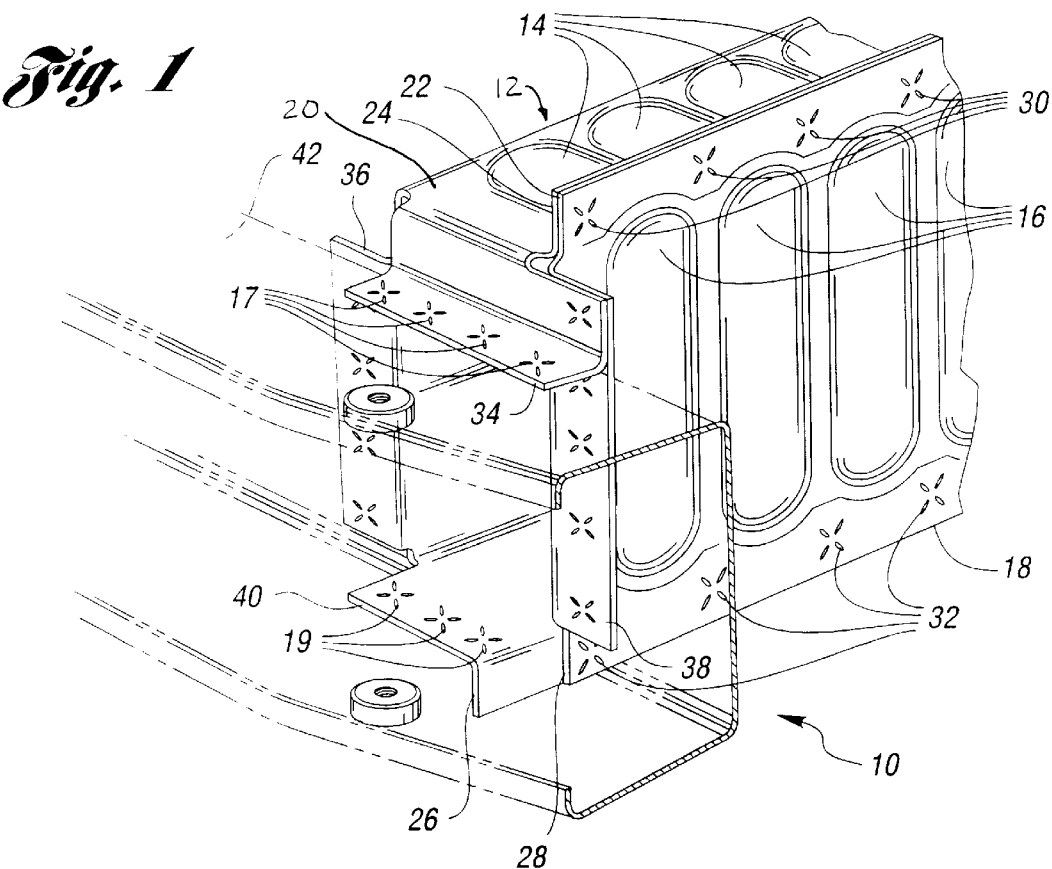
FIG. 1 shows a partially phantom perspective view of a front rail and cross-member assembly in accordance with the present invention.
Figure 2:
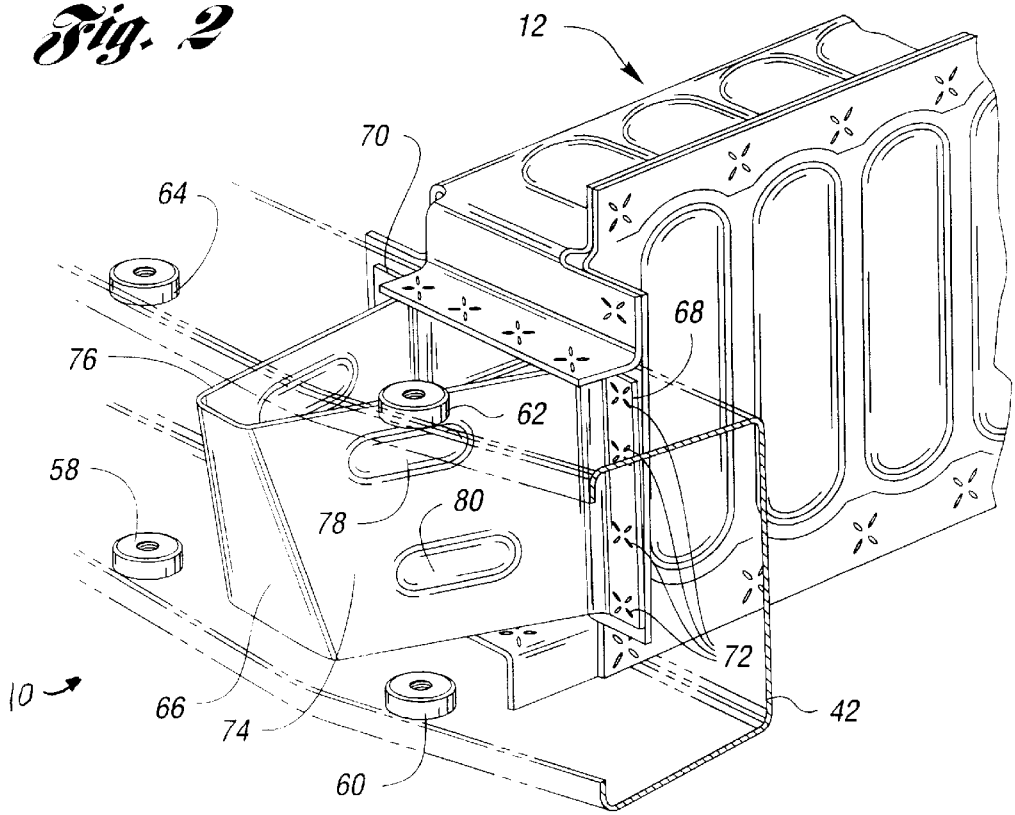
FIG. 2 shows a partially phantom perspective view of a front rail, cross-member and crush can assembly in accordance with the embodiment shown in FIG. 1.
Figure 3:
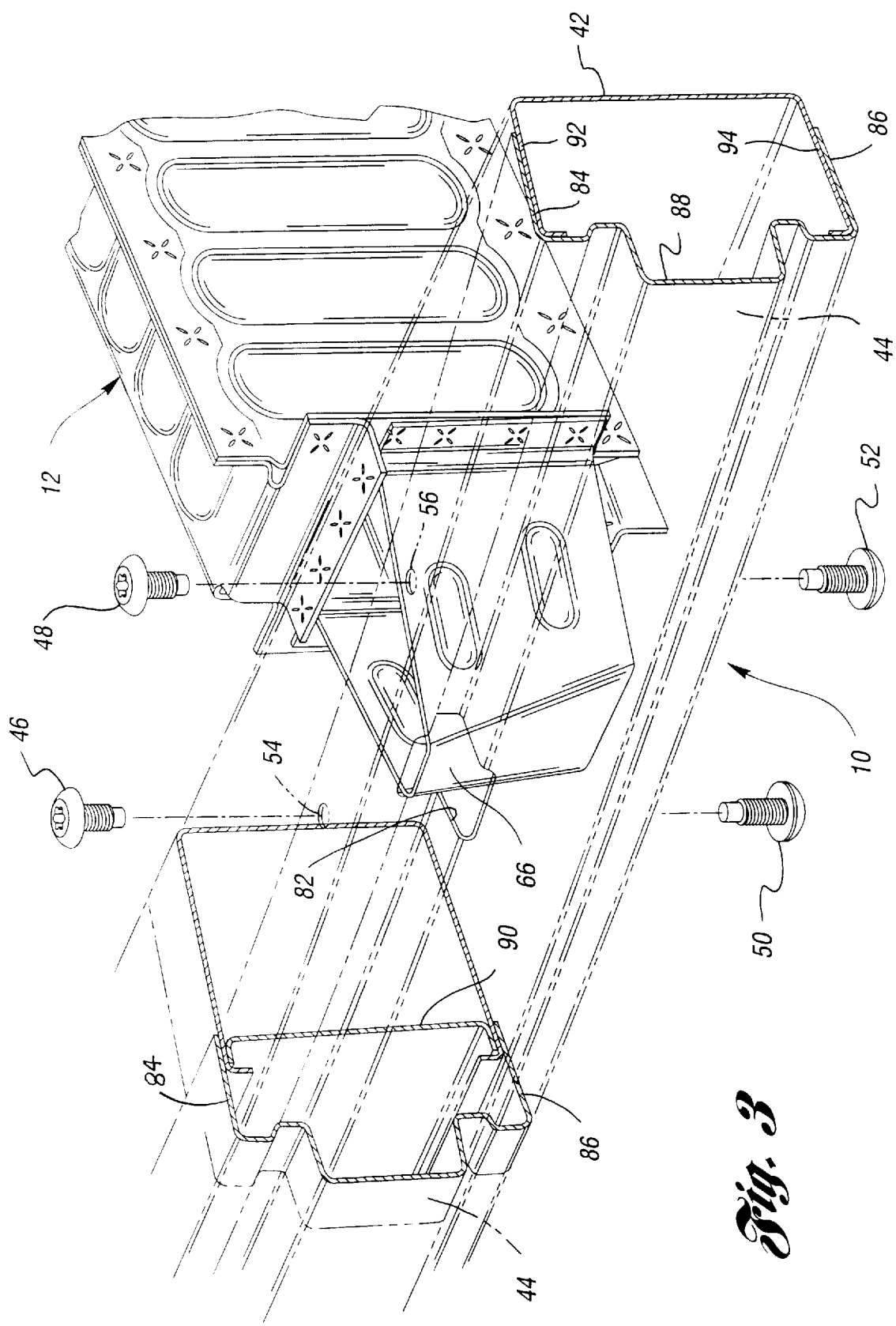
FIG. 3 shows a partially phantom perspective view of a bumper and front rail assembly in accordance with the present invention corresponding with the embodiment shown in FIGS. 1 and 2.

Referring to FIGS. 1–3, a bumper and front rail assembly 10 is shown in accordance with a first embodiment of the present invention. The bumper and front rail assembly 10 includes first and second front rails 12 (only one such rail is shown in FIGS. 1–3). The front rails 12 each include a plurality of convolutions 14,16 formed thereon to encourage natural and substantially sequential deformation of the rail 12 in a high energy impact. Each front rail 12 includes mating high strength steel components 18,20 having flanges 22, 24, 26, 28 extending therefrom to facilitate welding of the rail components 18,20 together at the weld locations 30,32, shown in FIG. 1.

The front rails 12 also include forward flanges 34, 36, 38, 40 which are adapted for welding to the steel cross-member 42 which extends between the first and second front rails 12 and comprises a substantially U-shaped cross-section. By welding the cross-member 42 to the front rails 12 at a plurality of locations 17 and 19 arranged longitudinally with respect to the cross-member, torsional rigidity is improved at the joint between the steel cross-member and the respective side rail such that energy from an offset frontal impact is more evenly distributed between the opposing front rails for energy management and dissipation.

Turning to FIG. 3, the bumper and front rail assembly 10 also includes a steel forward member 44 secured to the cross-member 42 and spanning the length thereof. The forward member 44 is configured to act as a spring for elastic deformation against the cross-member 42 in a low energy impact. The forward member 44 is secured to the cross-member 42 by the screws 46, 48, 50, 52 which extend through apertures 54,56, which are positioned along the cross-member 42 closely adjacent the respective front rail, and engage the threaded nuts 58, 60, 62, 64. In this configuration, substantial elastic flexing of the forward member 44 is allowed with respect to the cross-member 42 in a low energy impact.

As shown in FIG. 3, the bumper and front rail assembly 10 further comprises a steel reinforcement member 90 extending within the cross-member 42. The reinforcement member 90 and cross-member 42 cooperate to form a substantially rectangular cross-section for improved structural integrity.

The bumper and front rail assembly 10 further includes a crush can 66 disposed within the cross-member 42 immediately adjacent each front rail. The crush can 66 includes opposing flanges 68,70 extending therefrom to be welded to the rear of the cross-member 42 at the weld locations 72, as shown in FIG. 2. The crush cans 66 comprise high strength steel having tapered opposing walls 74,76 which extend to the opposing flanges 68,70, respectively. The opposing walls 74,76 have elongated bumps 78,80 formed thereon for added structural integrity. These crush cans 66 are configured for slight elastic deformation in a low energy impact, and are further configured for added structural integrity in a high energy impact. The reinforcement member 90 discussed above extends between the crush cans 66.

Figure 6:
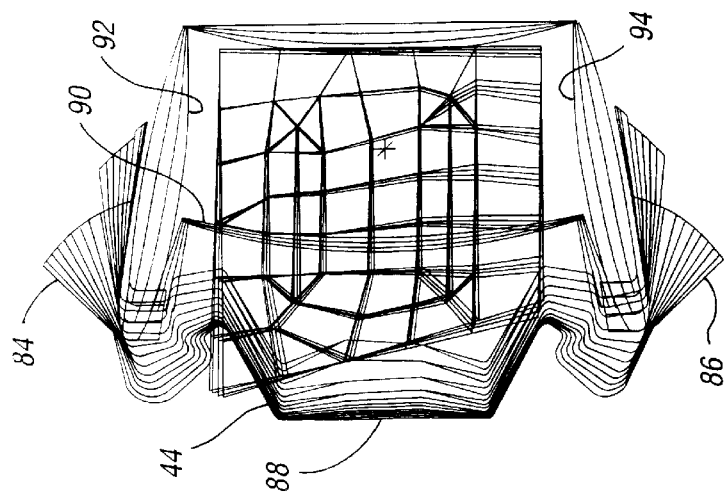
FIG. 6 shows a schematic finite element analysis model side view of a fully elastically deformed bumper cross-member and crush can assembly in accordance with the structure shown in FIGS. 4 and 5 illustrating sequential deformation positions.
Figure 5:
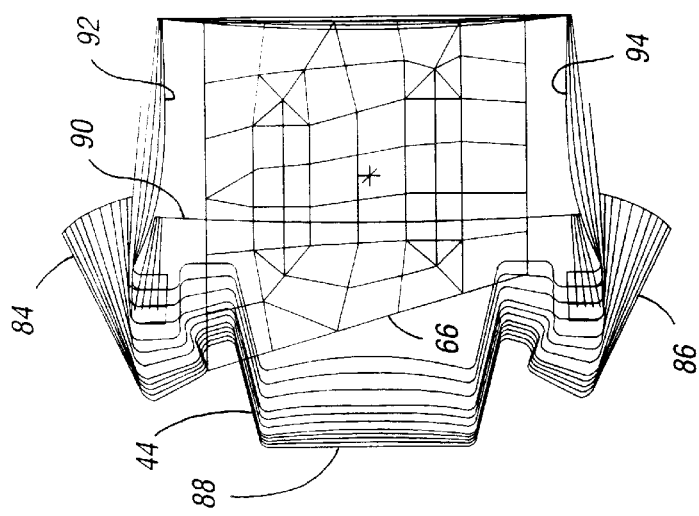
FIG. 5 shows a schematic finite element analysis model side view of a partially elastically deformed bumper, cross-member and crush can assembly in accordance with the embodiment shown in FIG. 4 illustrating sequential deformation positions.
Figure 4:
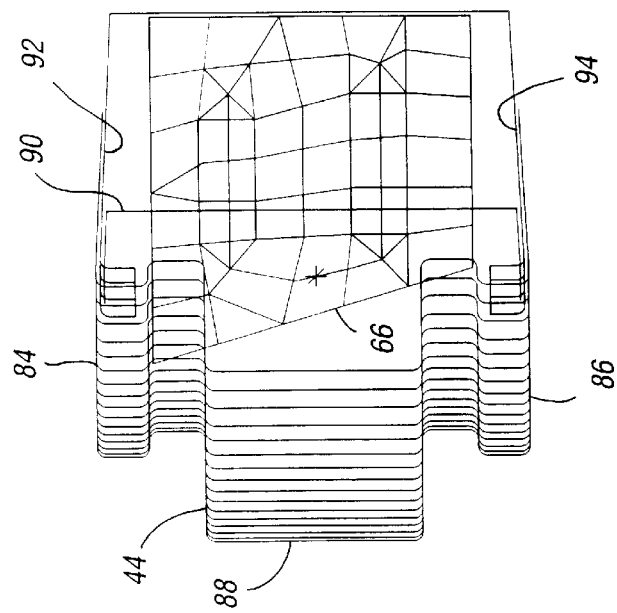
FIG. 4 shows a schematic finite element analysis model side view of the bumper, cross-member and crush can assembly of FIG. 3, taken along the center line of the front rail.

As shown in FIG. 3, an aperture 82 is formed in the forward member 44 so that crush can 66 does not interfere therewith in a low energy impact. In a low energy impact, the outer flanges 84,86 extend outwardly away from the cross-member 42 as the center portion 88 is deflected inward. This elastic deformation is illustrated sequentially in FIGS. 4–6. As shown, the center portion 88 is compressed into the cross-member 42 as the outer flanges 84,86 of the forward member 44 expand outwardly. The center portion 88 continues to deform into the cross-member 42 until the crush can 66 engages the forward peripheral edge of the aperture 82 in the forward member 44 such that the crush can 66 also begins to deform elastically, and the reinforcement member 90 also begins to bend elastically as a result of the slight separation of the opposing sides 92,94 of the cross-member 42. Deformation beyond this elastic point then becomes inelastic and the crush cans are operative to dissipate substantial energy in a high energy impact.

Figure 7:
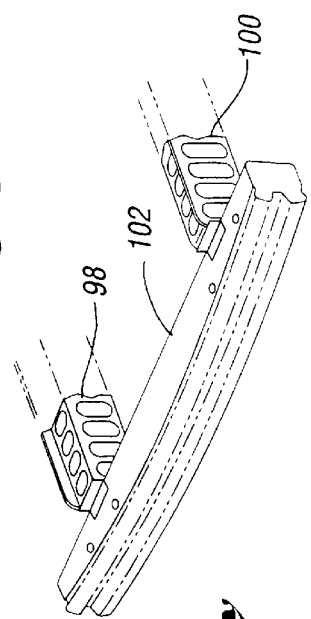
FIG. 7 shows a partially phantom perspective view of a bumper and front rail assembly in accordance with a alternative embodiment of the present invention.

Turning to FIGS. 7–9, an alternative embodiment of the present invention is shown. As shown in FIG. 7, this embodiment also comprises first and second front rails 98,100 having a cross-member 102 extending therebetween. This embodiment further comprises a forward member 104 secured by screws 106, 108, 110, 112 to the cross-member 102. A front plate 114 is welded to the forward member 104 to prevent buckling during certain frontal impacts. This embodiment also includes a center reinforcement 116 secured within the forward member 104 and having curves 118,120 formed therealong for added structural integrity. The forward member 102 is welded to the front rails 98,100 in the same manner as described above with reference to the embodiment shown in FIGS. 1–3. The reinforcement 116 is also welded to the cross-member 102.

Figure 10:
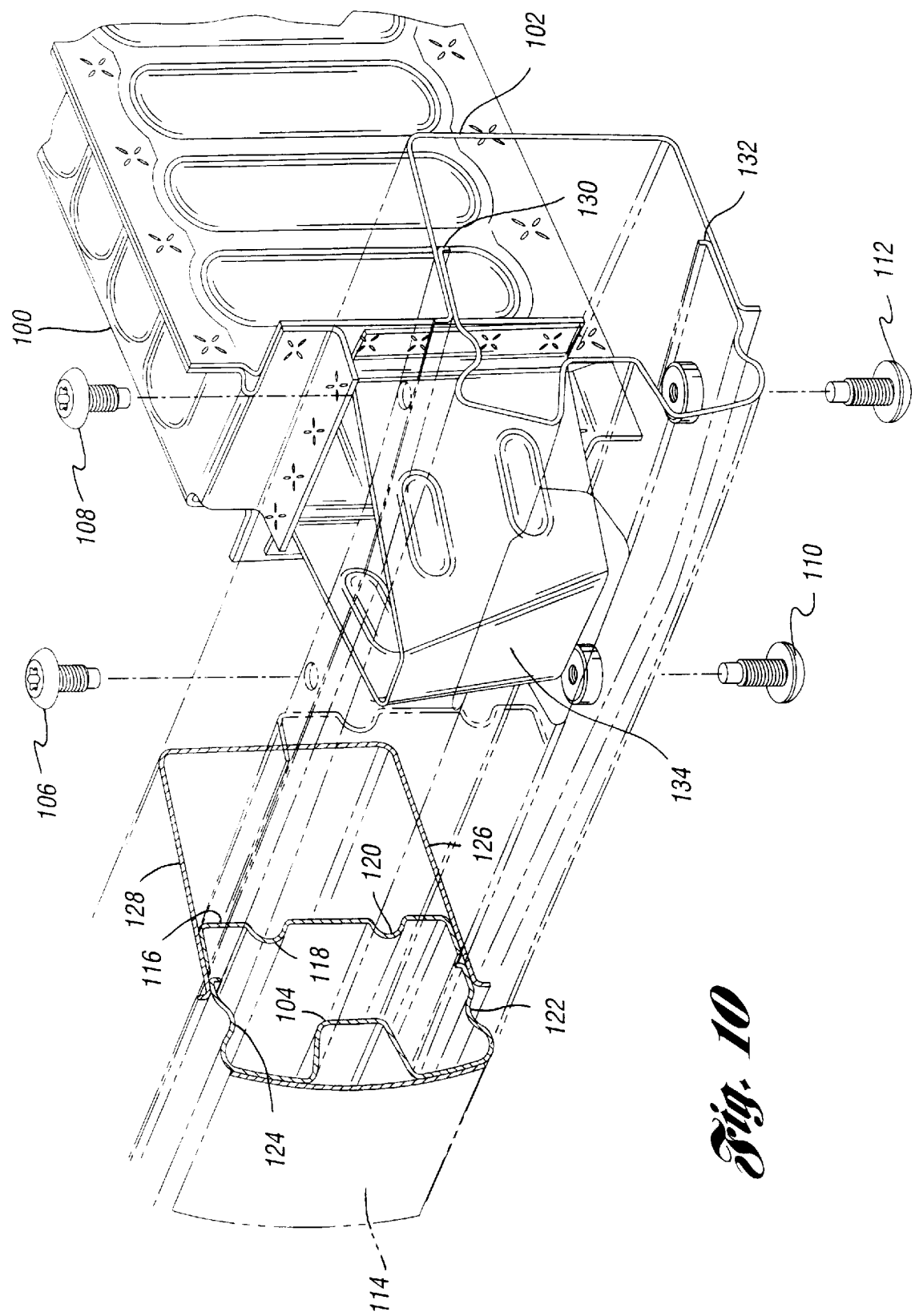
FIG. 10 shows a partially phantom partially cut-away perspective view of a bumper and front rail assembly in accordance with the embodiment shown in FIGS. 7–9.

In this embodiment, the forward member 104 includes opposing flanges 122,124 which are disposed within the opposing sides 126,128 of the cross-member 102 so that the opposing flanges 122,124 are elastically deformed inwardly with respect to the opposing sides 126,128 of the cross-member 102 in a low energy impact situation. The opposing flanges 122,124 include inwardly projecting portions 130, 132, shown in FIG. 10, to encourage such inward elastic deformation.

This embodiment also includes opposing crush cans 134 for further energy management.

Accordingly, in the above-described embodiments, low energy elastic deformation is achieved, as well as providing a front-loaded pulse for higher energy impacts which is operative to deploy an airbag and to begin substantial energy dissipation in the bumper area. These embodiments also provide more even loading of the opposing front rails in a frontal offset impact. To date, no such bumper and front system has been provided with such diverse energy management characteristics.

Each structural component comprises a high strength stamped steel which allows spring action in a 5 mile per hour impact. This spring action absorbs impact energy of the vehicle by allowing the forward member to deflect into the reinforcement and then both distort as a unit well within the elastic range of the material. Both parts are stressed on all surfaces relatively uniformly, thereby preventing localized high stress areas and permanent set. The shapes of the cross-member, reinforcement, and forward member affect energy management and impact response to prevent front fascia damage. The forward member tends to become straight because of the plan view sweep which grows in width, causing the forward member to load the crush cans. The stiffness of the vehicle front rails is set to yield above the yield point of the bumper system so there is no damage in a low energy impact.

While the best modes for carrying out the invention have been described in detail, those familiar with the art to which this invention relates will recognize various alternative designs and embodiments for practicing the invention within the scope of the appended claims.

What is claimed is:

1. A bumper and front rail assembly for a vehicle, comprising:

first and second front rails;

a steel cross-member extending between said first and second front rails and having a substantially U-shaped cross-section;

a steel forward member secured to said cross-member on a forward side of the cross-member and spanning the length thereof, said forward member being secured to the cross-member only at locations near the front rails to permit elastic deformation therebetween such that the forward member acts as a spring for elastic deformation against said cross-member in a low-energy impact; and first and second steel crush cans positioned in said cross-member adjacent said first and second front rails, respectively.

2. The bumper and front rail assembly of claim 1, wherein said front rails each comprise first and second flanges extending therefrom for engagement with said steel cross-member, each said flange being welded to the cross-member at a plurality of weld locations arranged longitudinally with respect to the cross-member for torsional rigidity.

3. The bumper and front rail assembly of claim 1, further comprising a steel reinforcement member extending lengthwise within said cross-member between said crush cans, said reinforcement member and said cross-member cooperating to form a substantially rectangular cross-section for improved structural integrity.

4. The bumper and front rail assembly of claim 1, wherein said forward member comprises an aperture formed therein corresponding with each said crush can such that the crush cans protrude through the respective aperture in a manner such that a clearance gap exists between the crush can and the forward edge of the respective aperture to permit such elastic deformation.

5. The bumper and front rail assembly of claim 1, wherein each said crush can comprises opposing flanges welded to the cross-member.

6. The bumper and front rail assembly of claim 5, wherein each said crush can comprises opposing angled surface portions with elongated bumps formed thereon to encourage natural sequential end-to-end deformation thereof.

7. The bumper and front rail assembly of claim 1, wherein said forward member comprises opposing outer flange portions spanning the length thereof and engaged with said cross-member outside said substantially U-shaped cross-section such that said outer flange portions deform outward away from the cross-member in an elastic deformation situation.

8. The bumper and front rail assembly of claim 1, wherein said forward member comprises opposing outer flange portions spanning the length thereof and engaged with said cross-member inside said substantially U-shaped cross-section such that said outer flange portions deform inward within the U-shaped cross-section in an elastic deformation situation.

9. The bumper and front rail assembly of claim 1, wherein the cross-member, forward member and crush cans are sufficiently stiff to provide a deceleration pulse sufficient to deploy an airbag in a high energy frontal impact.

10. A bumper assembly for attachment to the front rails of a vehicle, comprising:
   a steel cross-member adapted for attachment to the front rails for extending thereacross, and having a substantially U-shaped cross-section;
   a steel forward member secured to said cross-member and spanning the length thereof, said forward member being sufficiently flexible to act as a spring for elastic deformation against said cross-member in a low-energy impact; and
   first and second steel crush cans positioned in said cross-member adjacent said first and second front rails, respectively wherein said forward member comprises an aperture formed therein corresponding with each said crush can such that the crush cans protrude through the respective aperture in a manner such that a clearance gap exists between the crush can and the forward edge of the respective aperture to permit such elastic deformation.

11. The bumper assembly of claim 10, further comprising a steel reinforcement member extending lengthwise within said cross-member between said crush cans, said reinforcement member and said cross-member cooperating to form a substantially rectangular cross-section for improved structural integrity.

12. The bumper assembly of claim 10, wherein said forward member is secured to the cross-member only at locations near said crush cans to permit a greater degree of said elastic deformation between the crush cans.

13. The bumper assembly of claim 10, wherein each said crush can comprises opposing flanges welded to the cross-member.

14. The bumper assembly of claim 10, wherein each said crush can comprises opposing angled surface portions with elongated bumps formed thereon to encourage natural sequential end-to-end deformation thereof.

15. The bumper assembly of claim 10, wherein said forward member comprises opposing outer flange portions spanning the length thereof and engaged with said cross-member outside said substantially U-shaped cross-section such that said outer flange portions deform outward away from the cross-member in an elastic deformation situation.

16. The bumper assembly of claim 10, wherein said forward member comprises opposing outer flange portions spanning the length thereof and engaged with said cross-member inside said substantially U-shaped cross-section such that said outer flange portions deform inward within the U-shaped cross-section in an elastic deformation situation.

17. The bumper assembly of claim 10, wherein the cross-member, forward member and crush cans are sufficiently stiff to provide a deceleration pulse sufficient to deploy an airbag in a high energy frontal impact.

18. A bumper and front rail assembly for a vehicle, comprising:
   first and second front rails;
   a steel cross-member extending between said first and second front rails and having a substantially U-shaped cross-section;
   a steel forward member secured to said cross-member and spanning the length thereof, said forward member being secured to the cross-member only at locations near the front rails to permit elastic deformation therebetween such that the forward member acts as a spring for elastic deformation against said cross-member in a low-energy impact;
   first and second steel crush cans positioned in said cross-member adjacent said first and second front rails, respectively; and
   a steel reinforcement member extending within the cross-member between the crush cans, said reinforcement member and said cross-member cooperating to form a substantially rectangular cross-section for improved structural integrity.

19. A bumper and front rail assembly for a vehicle, comprising:
   first and second front rails;
   a steel cross-member extending between said first and second front rails and having a substantially U-shaped cross-section;
   a steel forward member secured to said cross-member on a forward side of the cross-member and spanning the length thereof, said forward member being sufficiently flexible to act as a spring for elastic deformation against said cross-member in a low energy impact, wherein said forward member comprises opposing outer flange portions spanning the length thereof and engaged with said cross-member outside said substantially U-shaped cross-section such that said outer flange portions deform outward away from the cross-member in an elastic deformation situation; and
   first and second steel crush cans positioned in said cross-member adjacent said first and second front rails, respectively.

20. A bumper and front rail assembly for a vehicle, comprising:

first and second front rails;

a steel cross-member extending between said first and second front rails and having a substantially U-shaped cross-section with a forward-facing opening along the length thereof;

a steel forward member secured to said cross-member on a forward side of the cross-member within said forward-facing opening and spanning the length thereof, said forward member being sufficiently flexible to act as a spring for elastic deformation against said cross-member in a low energy impact, wherein said forward member comprises a center portion with opposing outer flange portions extending generally perpendicularly with respect to said center portion and spanning the length of the center portion and engaged with said cross-member inside said substantially U-shaped cross-section such that said outer flange portions deform inward within the U-shaped cross-section in an elastic deformation situation; and first and second steel crush cans positioned in said cross-member adjacent said first and second front rails, respectively.

* * * * *